United States Patent
Fenchel et al.

(10) Patent No.: US 8,939,750 B2
(45) Date of Patent: Jan. 27, 2015

(54) STRAND PELLETIZER

(75) Inventors: Sven Fenchel, Babenhausen/Langstadt (DE); Jochen Scheurich, Niedernberg (DE)

(73) Assignee: Automatik Plastics Machinery GmbH, Niedernberg (DE)

( * ) Notice: Subject to any disclaimer, the term of this patent is extended or adjusted under 35 U.S.C. 154(b) by 0 days.

(21) Appl. No.: 12/738,680

(22) PCT Filed: Oct. 15, 2008

(86) PCT No.: PCT/EP2008/008727
§ 371 (c)(1), (2), (4) Date: Jul. 8, 2010

(87) PCT Pub. No.: WO2009/052978
PCT Pub. Date: Apr. 30, 2009

(65) Prior Publication Data
US 2010/0297278 A1 Nov. 25, 2010

(30) Foreign Application Priority Data
Oct. 23, 2007 (DE) .................... 20 2007 014 782 U

(51) Int. Cl.
*B28B 11/14* (2006.01)
*B41J 3/54* (2006.01)
*G06F 3/12* (2006.01)

(52) U.S. Cl.
CPC .............. *B41J 3/543* (2013.01); *G06F 3/1293* (2013.01)
USPC ........... 425/315; 425/292; 425/307; 425/311; 425/313; 425/316; 83/404.1; 83/421; 83/436.3; 83/436.6; 83/446; 264/141; 264/143; 264/148

(58) Field of Classification Search
CPC .................................. B28B 11/163; B28B 9/06
USPC .......... 425/292, 301, 307, 308, 310, 311, 313, 425/315, 316; 83/404.1, 421, 436.3, 436.4, 83/436.6, 444, 446; 264/141, 143, 148
See application file for complete search history.

(56) References Cited

U.S. PATENT DOCUMENTS 3,076,999 A * 2/1963 Washburn ...................... 425/316
3,651,726 A * 3/1972 Laroche ........................... 83/169

(Continued)

FOREIGN PATENT DOCUMENTS

DE 2218210 A 4/1972
DE 2503455 A1 1/1976

(Continued)

OTHER PUBLICATIONS

International Preliminary Report on Patentability in related application PCT/EP2008/008727 mailed May 11, 2010.

(Continued)

*Primary Examiner* — Seyed Masoud Malekzadeh

(57) ABSTRACT

The invention relates to a device for pelletizing at least one strand of material to be pelletized. Said device comprises a cutting device with two blades that can be displaced relative each other, at least one feed roller and at least one strand feeder for feeding the strand to the cutting device. An additional tab-shaped rectification guide is arranged downstream of the strand feeder in the region directly in front of the feed roller and next to the same, said guide being adjustable and movable in relation to the strand feeder. The rectification guide can be used to adjust the angle at which the strand is fed to the feed roller.

2 Claims, 1 Drawing Sheet

(56) References Cited

U.S. PATENT DOCUMENTS

| | | | |
|---|---|---|---|
| 4,025,252 A * | 5/1977 | Hunke | 425/67 |
| 4,124,341 A * | 11/1978 | Locker | 425/136 |
| 4,340,342 A * | 7/1982 | Kim | 425/72.1 |
| 4,528,157 A * | 7/1985 | Lettner et al. | 264/237 |
| 4,530,649 A * | 7/1985 | Philipp et al. | 425/71 |
| 4,759,248 A * | 7/1988 | Muller et al. | 83/349 |
| 4,913,899 A * | 4/1990 | Hartig | 425/71 |
| RE33,492 E * | 12/1990 | Hunke | 210/173 |
| 5,066,210 A * | 11/1991 | Hunke | 425/71 |
| 5,118,270 A * | 6/1992 | Keilert et al. | 425/72.1 |
| 5,146,822 A * | 9/1992 | Noda et al. | 83/22 |
| 5,182,115 A * | 1/1993 | Nogossek et al. | 425/71 |
| 5,242,289 A * | 9/1993 | Forgash et al. | 425/71 |
| 5,265,507 A * | 11/1993 | Noda et al. | 83/22 |
| 5,474,435 A * | 12/1995 | Hunke | 425/71 |
| 5,545,025 A * | 8/1996 | Tanaka | 425/315 |
| 5,634,601 A * | 6/1997 | Hild et al. | 241/224 |
| 5,787,604 A * | 8/1998 | Kreuz et al. | 34/384 |
| 5,863,564 A * | 1/1999 | Yoon | 425/71 |
| 5,888,554 A * | 3/1999 | Zollitsch et al. | 425/71 |
| 6,039,905 A * | 3/2000 | Zollitsch et al. | 264/143 |
| 6,197,355 B1 * | 3/2001 | Zietlow et al. | 426/289 |
| 6,347,932 B1 | 2/2002 | Kim | |
| 6,379,137 B1 * | 4/2002 | Ecker | 425/71 |
| 6,428,298 B1 * | 8/2002 | Clauss et al. | 425/71 |
| 6,761,550 B2 * | 7/2004 | Zietlow et al. | 425/73 |
| 6,779,429 B2 * | 8/2004 | Meidhof et al. | 83/674 |
| 7,455,873 B2 * | 11/2008 | Zietlow et al. | 426/660 |
| 2005/0053689 A1 * | 3/2005 | Fetter et al. | 425/308 |
| 2005/0077644 A1 | 4/2005 | Bryan et al. | |

FOREIGN PATENT DOCUMENTS

| | | |
|---|---|---|
| DE | 3145613 A1 | 5/1983 |
| DE | 4026337 A1 | 2/1992 |
| DE | 19931222 A1 | 1/2001 |
| DE | 2627263 B | 12/2007 |
| EP | 0303166 A | 2/1989 |
| JP | 52155664 A | 12/1977 |
| JP | 54052161 A | 4/1979 |
| JP | 61152407 | 9/1986 |
| JP | 61152408 | 9/1986 |

OTHER PUBLICATIONS

German Search Report in related application No. 20 2007 014 782.1 issued on Apr. 24, 2008.

International Search Report in Application PCT/EP2008/008727 mailed Feb. 25, 2009.

European Examination Report issued in EP Application No. 08842258.9 on Sep. 21, 2012.

Translation of Office Action issued in CN Application No. 200880112616.0 on Apr. 18, 2012.

Translation of Office Action issued in CN Application No. 200880112616.0 on Dec. 31, 2012.

Translation of Office Action issued in JP Application No. 2010-530311 dated Sep. 9, 2012.

* cited by examiner

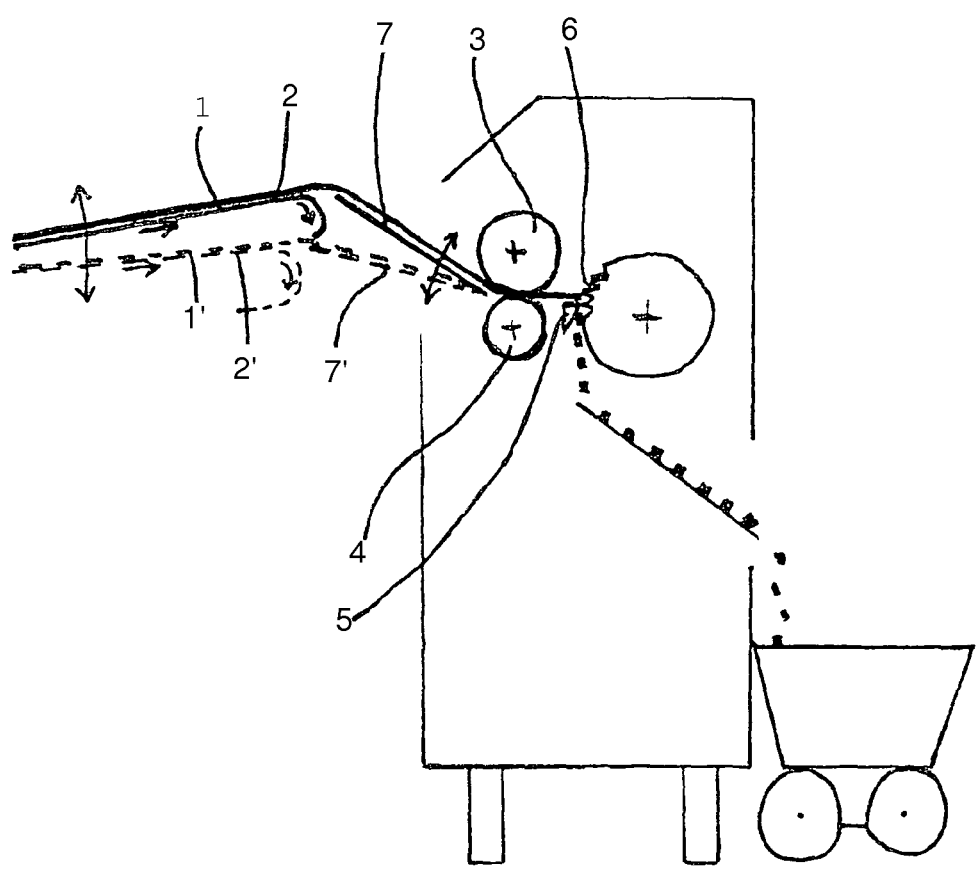

STRAND PELLETIZER

CROSS REFERENCE TO RELATED APPLICATIONS

This application is a U.S. National phase of International Application No. PCT/EP2008/008727, filed Oct. 15, 2008, which in turn claims priority to German Patent Application No. 20 2007 014 782.1, filed on Oct. 23, 2007. The contents of which are incorporated herein by reference in its entirety.

BACKGROUND OF THE INVENTION

The invention relates to a device for pelletizing at least one strand of material to be pelletized by means of a cutting device with two blades that can be displaced relative to each other, at least one feed roller and at least one strand feeder for feeding the strand to the cutting device according to the preamble of claim 1.

In general, there is the problem with such strand pelletizing devices that, under certain conditions, irregularities can be encountered upon the feeding of the strand to the cutting device. This can happen, above all, in a start-up procedure. Because of the possible inhomogeneous strand material, clumping, superposition or strand breakage can happen.

Furthermore, conventional strand pelletizing devices usually require that, upon retooling for different materials to be pelletized, extensive structural changes have to be made in order to adapt the strand guiding device to the respective strand material, the respective strand thickness, the respective viscosity of the strand materials and the like.

Furthermore, the above problems foreclose a far reaching or complete automation of the operation of conventional strand pelletizing devices, in particular an automatic start-up operation of such devices.

In the preamble of the US-application US 2005/0077644 A1 various state of the art in the field of strand guiding devices of strands to be pelletized is described. There is shown, for example, a cascade chute which is not adjustable and is exposed to a water stream, or a vertical strand guiding plate which is not adjustable in its inclination.

Therefore, it is an object of the present invention, to provide a device for pelletizing of at least one strand out of material to be pelletized which device overcomes the disadvantages of the state of the art and offers in particular in a structurally simple way a cost efficient operation, an improved adaptability to different working conditions, in particular in the start-up procedure, and, where required, an automation of the operation as far as possible, also here in particular for the start-up procedure.

This object is achieved according to the invention by a device having the features of claim 1.

Preferred embodiments of the invention are defined in the sub-claims.

The inventive device for pelletizing at least one strand of material to be pelletized comprises a cutting device with two blades that can be displayed relative to each other, at least one feed roller and at least one strand feeder for feeding the strand to the cutting device. Downstream of the actual strand feeder in the region directly in front of the feed roller and next to the same, i.e. between the actual strand feeder and the feed roller of the cutting device, an additional tap-shaped rectification guide which is adjustable in its inclination and movable in relation to the strand feeder, is arranged according to the invention by which guide the angle at which the strand is fed to the feed roller or is adapted to be fed, respectively, is adjustable. The rectification guide can, therein, be provided without further water or fluid supply. By means of the adjustability of the angle an adaptation to different working conditions, strand materials, start-up processes and the like is enabled as far as possible by means of a structurally simple and, thereby, cost effective way. An automatic operation can, therefore, be realized according to the invention in a comparatively simple way.

The special structural simplicity can, according to the invention, additionally be achieved thereby that the rectification guide is arranged at an angle which is inclined downwards with respect to the vertical in such a way that the strand moving thereon, is supplied to the feed roller at least there, i.e. in the region of the rectification guide, under the influence of gravity without further moving means, i.e. particular without further strand feeding devices such as like belt conveyors or under the influence of a feeding fluid, (only) under the influence of gravity without further feeding means.

A particular adaptability can be structurally achieved if, in the inventive device, the inclination of the rectification guide and the inclination of the strand feeder may be adjusted separately from each other, preferably even independently from each other.

The invention will be explained in more detail in the following with reference to the one single FIG. 1 with the embodiment which is shown there as an example.

BRIEF DESCRIPTION OF THE DRAWINGS

FIG. 1 shows a schematic side view of an inventive device for pelletizing at least one strand 1, 1' of material to be pelletized. Therein, the inventive device can particularly be used for any material adapted to be pelletized.

DETAILED DESCRIPTION OF EXEMPLARY EMBODIMENTS

The device comprises a cutting device with two blades 5, 6 that can be moved relative to each other, two feed rollers 3, 4 and a strand feeder 2, 2' for feeding the strand 1, 1' to the cutting device. Downstream of the strand feeder 2, 2' an additional tap-shaped rectification guide 7, 7' is arranged in the region directly in front of the feed rollers 3, 4 and next to the same which guide is adjustable in its inclination and movable, according to the invention, in relation to the strand feeder 2, 2'. By means with this rectification guide 7, 7' the angle at which the strand 1, 1' is fed to the feed roller 3, 4 can be adjusted. In FIG. 1, two different angle positions are to be seen. The position shown in solid lines shows a larger inclination of the rectification guide 7 and a corresponding course of the strand 1 as well as an adapted position of the strand feeder 2. The position of the rectification guide 7' shown in broken lines, shows a shallower angle with a corresponding guided course of the strand 1' as well as a correspondingly adapted position of the strand feeder 2'.

According to the invention, the rectification guide 7, 7' is, according to FIG. 1, arranged in an angle which is downwardly inclined with respect to the vertical such that the strand 1, 1' moving thereon is fed at least in this region to the rectification guide under the influence of gravity and without further moving means, for example without further conveyor belts or water chutes or also without any other fluid supply to the feed rollers 3, 4.

The adjustment of the angle of the rectification guide 7, 7' is effected, according to the embodiment shown in FIG. 1, by means of a corresponding pivoting movement about a rotational axis in the region immediately in front of the feed rollers 3, 4 or immediately adjacent thereto.

According to the invention, the rectification guide 7, 7' as well as the strand feeder 2, 2' are adapted to be adjusted separately from each other, as shown in FIG. 1, whereby there is also the possibility for the adjustability independent from each other.

By means of the device of the invention, a particularly well adaptability to different working conditions, in particular to different strand materials, can be effected in a structurally simple and cost effective way, and, in particular, an automation of the operation as far as possible, in particular of the start-up procedure, can be achieved in such a device according to the invention.

The invention claimed is:

1. A device for pelletizing at least one strand of a material to be pelletized, comprising:
    a cutting device with at least two blades configured to be displaced relative to each other,
    at least one feed roller,
    at least one strand feeder for feeding the strand to the cutting device, the at least one strand feeder having an inclination, and
    a rectification guide arranged downstream of the at least one strand feeder in a region in front of the at least one feed roller, the rectification guide being pivoted about a rotational axis located directly in front of the at least one feed roller at a location downstream of the at least one strand feeder and immediately adjacent to the at least one feed roller,
    wherein an inclination of the rectification guide is adjustable and the rectification guide is moveable in relation to the at least one strand feeder such that the rectification guide adapted to be positioned at an angle at which the at least one strand is fed to the at least one feed roller and is adjustable to such an extent that to allow for a change in an angle of incidence of the at least one strand to the at least one feed roller,
    wherein the inclination of the rectification guide and the inclination of the at least one strand feeder are adjustable independently and separately from each other.

2. The device according to claim 1, wherein the rectification guide is arranged at an angle downwardly inclined with respect to a vertical direction in such a way that the at least one strand moving on the rectification guide is fed at least there under an influence of gravity without further moving parts.

* * * * *